United States Patent [19]

Föhl

[11] Patent Number: 5,676,396
[45] Date of Patent: Oct. 14, 1997

[54] VEHICLE STEERING WHEEL ASSEMBLY ADAPTED TO BE FITTED WITH AN INTEGRAL GAS BAG RESTRAINING SYSTEM

[75] Inventor: Artur Föhl, Auf der Halde, Germany

[73] Assignee: TRW Repa GmbH, Alfdorf, Germany

[21] Appl. No.: 498,955

[22] Filed: Jul. 6, 1995

[30] Foreign Application Priority Data

Jul. 7, 1994 [DE] Germany ............ 44 23 963.7

[51] Int. Cl.⁶ .................................. B60R 21/16
[52] U.S. Cl. ...................... 280/731; 280/728.2
[58] Field of Search .................. 280/731, 728.2, 280/743.1, 728.1

[56] References Cited

U.S. PATENT DOCUMENTS

| 3,907,330 | 9/1975 | Kondo et al. | 286/731 |
|---|---|---|---|
| 5,419,585 | 5/1995 | Breed et al. | 280/731 |
| 5,470,099 | 11/1995 | Williams | 280/728.2 |
| 5,562,301 | 10/1996 | Latz | 280/728.2 |
| 5,584,503 | 12/1996 | Latz | 280/731 |

FOREIGN PATENT DOCUMENTS

| 2359952 | 6/1974 | Germany . | |
|---|---|---|---|
| 2360926 | 6/1974 | Germany . | |
| 2524632 | 12/1975 | Germany . | |
| 2600426 | 7/1976 | Germany . | |
| 3126079 | 4/1982 | Germany . | |
| 0105535 | 4/1984 | Germany . | |
| 4140275 | 6/1992 | Germany . | |
| 4226101 | 2/1994 | Germany . | |
| 6452849 | 3/1989 | Japan . | |
| 1136847 | 8/1989 | Japan . | |
| 6016102 | 1/1994 | Japan . | 280/731 |
| 6270817 | 9/1994 | Japan . | |
| 2192841 | 1/1988 | United Kingdom . | |
| 2282352 | 4/1995 | United Kingdom . | |

Primary Examiner—Christopher P. Ellis
Attorney, Agent, or Firm—Tarolli, Sundheim, Covell, Tummino & Szabo

[57] ABSTRACT

A vehicle steering wheel with an integrated gas bag restraining system comprises a plastic foam encased steering wheel body, whose hub part (18) is designed to receive a folded up gas bag (24). A cover (30) for the gas bag (24) is an integral component of the plastic foam case, in whose opening a housing body (40) is able to be inserted, wherein a pyrotechnic propellant charge and a fuse are arranged. The housing body (40) is secured on the one hand to the hub part (18) and on the other hand to the steering shaft.

7 Claims, 3 Drawing Sheets

VEHICLE STEERING WHEEL ASSEMBLY ADAPTED TO BE FITTED WITH AN INTEGRAL GAS BAG RESTRAINING SYSTEM

BACKGROUND OF THE INVENTION

The invention relates to a vehicle steering wheel assembly adapted to be fitted with an integral gas bag restraining system, comprising a steering wheel body encased in plastic foam, whose hub part is designed to receive a folded gas bag, and a cover for the gas bag.

A vehicle steering wheel conventionally comprises a metallic steering wheel body, which is also termed a steering wheel skeleton, and a layer of plastic foam, or casing, completely or partially surrounding the steering wheel body. On the central hub part of the vehicle steering wheel the steering wheel rim is mounted by the intermediary of a plurality—normally three—of spokes. The hub part is provided with an axial through hole for the end of the steering wheel shaft. The attachment to the steering wheel shaft is by means of a nut screwed on the end thereof. After the attachment of the vehicle steering wheel on the steering wheel shaft a complete gas bag module with a folded gas bag and a gas generator is inserted into the hollow hub part. Finally a cover for the gas bag module is put in place.

SUMMARY OF INVENTION

The invention provides a vehicle steering wheel of this type, whose manufacture and assembly are substantially simplified. In the vehicle steering wheel of the invention the cover is an integral component of the plastic foam casing of the steering wheel body; the hub part has a bottom with a cutout, in whose opening a housing body is able to be inserted which contains a pressurized gas source and on one side is able to be attached to the hub part and on the opposite side to a steering wheel shaft. Owing to this design of the vehicle steering wheel separate manufacture and assembly of the cover are no longer necessary. The vehicle steering wheel with an integrated gas bag restraining system may be supplied as a finished subassembly. The attachment on the end of the steering shaft is by means of the housing body. Preferably, for this purpose the latter possesses an internally splined bushing for attachment on the correspondingly externally splined end of the steering shaft. This bushing is then clamped on the end of the steering shaft with a clamping force acting athwart the axis. It is however also possible to provide for conventional attachment by means of a screw nut screwed on the end of the steering shaft. In this case the bottom of the bushing is provided with a hole for the passage of the end of the steering shaft and the housing body possesses an axial passage for a fitting tool. A corresponding opening is then also to be provided in the cover. After fitting has been performed such opening may be closed by a plug.

Further advantageous developments and convenient forms of the invention will be understood from the following detailed disclosure in conjunction with the accompanying drawings.

DETAILED DESCRIPTION

Figure 1:
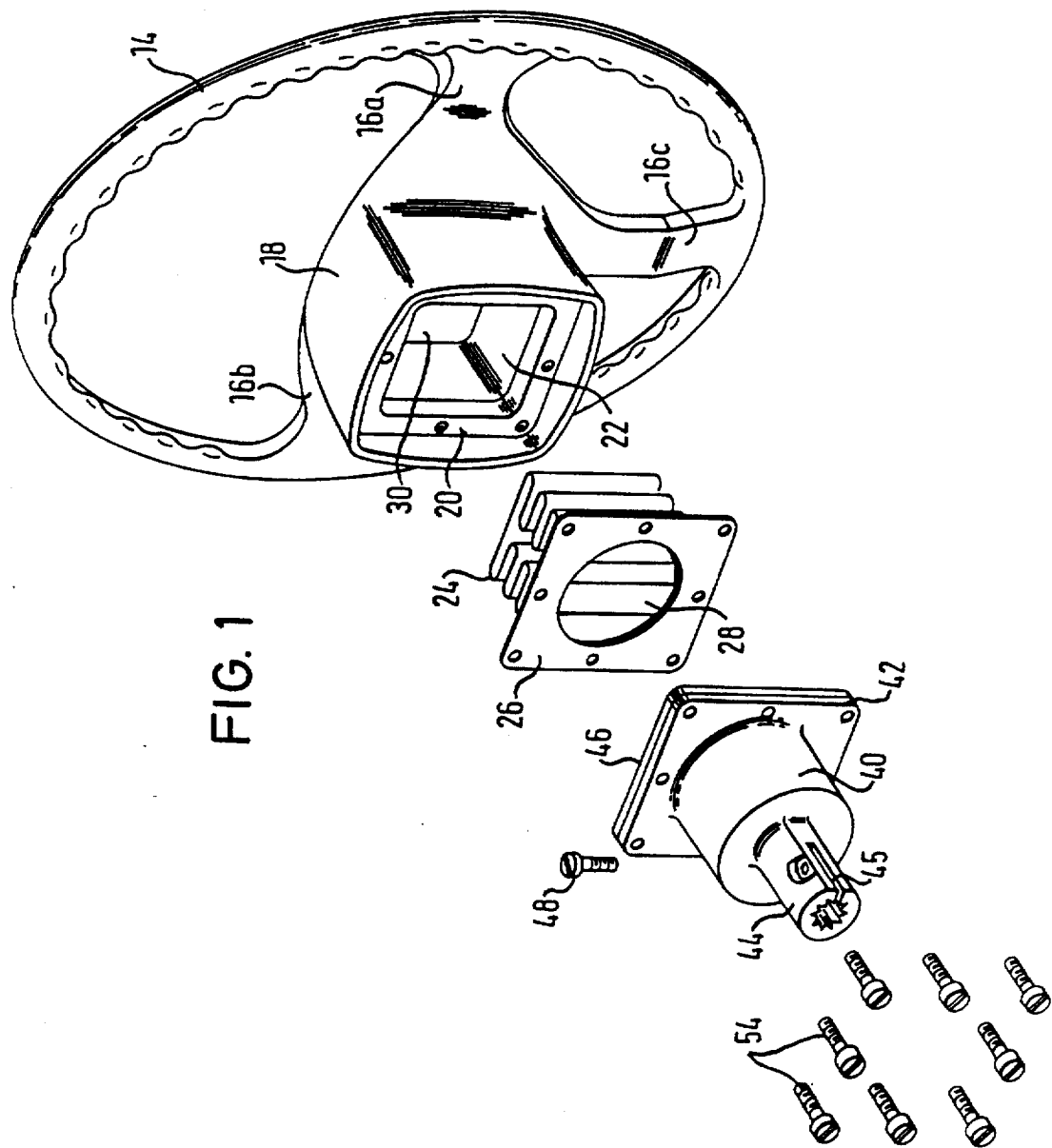
FIG. 1 is an exploded view of a preferred embodiment of the vehicle steering wheel.
Figure 3:
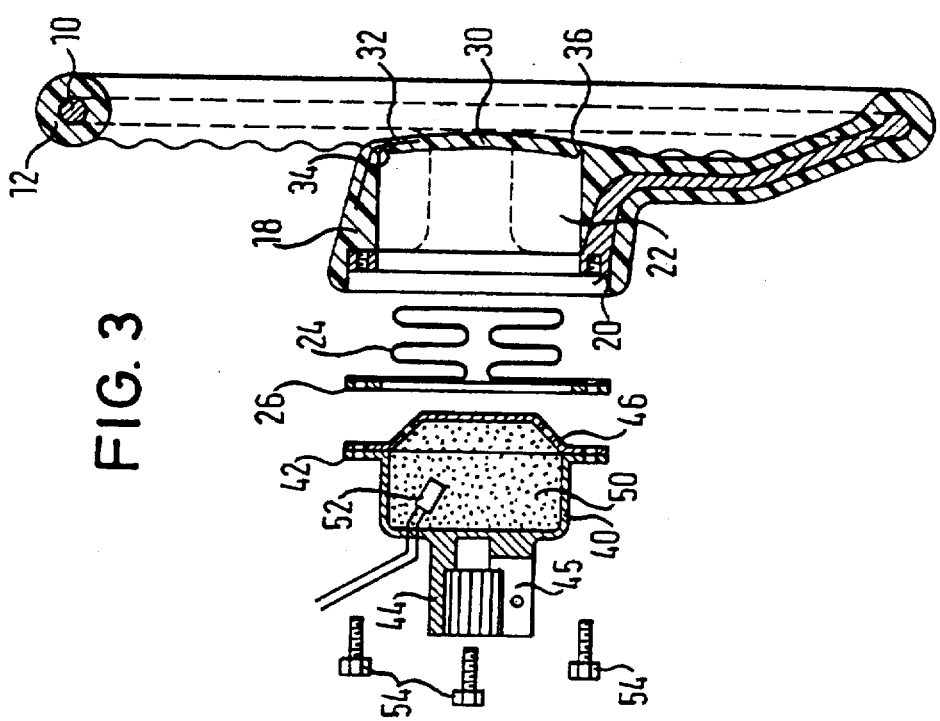
FIG. 3 is an exploded view as shown in section of the vehicle steering wheel.
Figure 2:
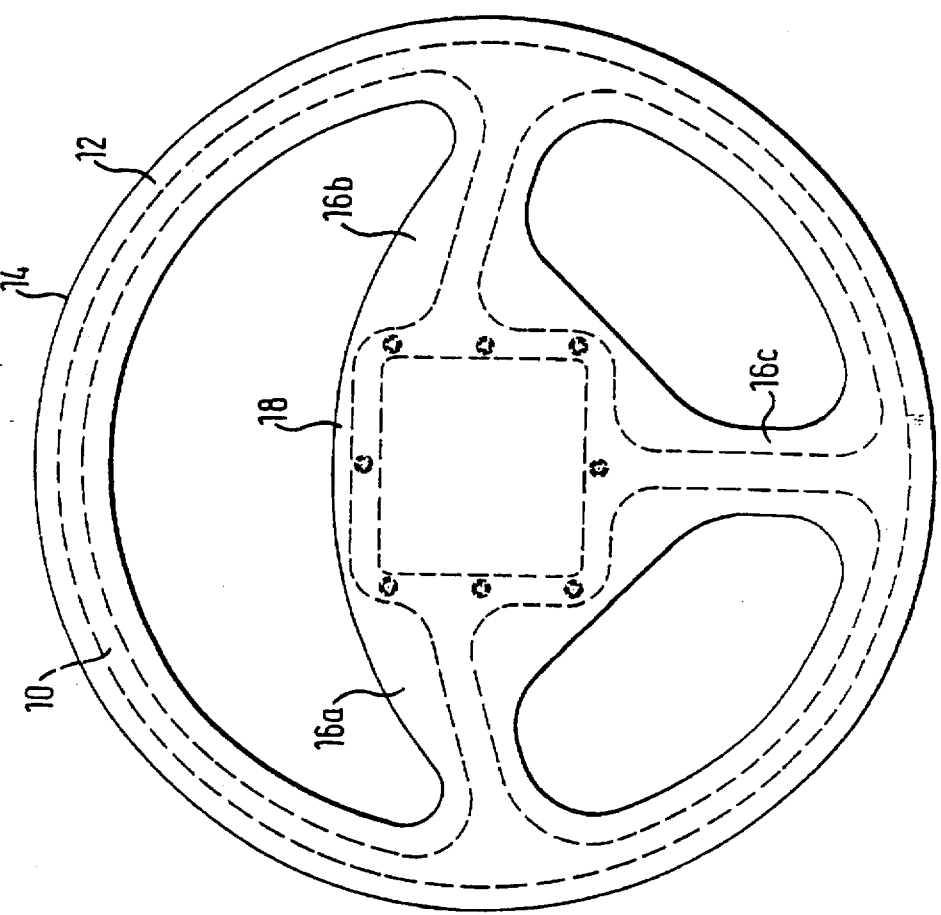
FIG. 2 is a plan view of the vehicle steering wheel as seen from the front.

In a conventional manner the vehicle steering wheel comprises a metallic steering wheel body 10, which is completely encased in a plastic foam casing 12. The steering wheel rim 14 is connected via three spokes 16a, 16b and 16c with a central hub part 18. The hub part 18 possesses a floor with a cutout, whose opening is bordered by an annular, sunken abutment surface 20. In the illustrated working embodiment the hub part 18 is generally rectangular in cross section so that the abutment surface 20 is correspondingly rectangular also.

In the interior of the hub part 18 a receiving space 2 is formed for a folded gas bag 24. The gas bag 24 is provided with an attachment ring 26, which constitutes the rim of its inflation opening 28 and is adapted to the form of the abutment surface 20. On the front side of the vehicle steering wheel the receiving space 22 is closed by a cover 30 formed integrally with the plastic foam casing 12. Such cover 30 is provided in a conventional fashion with embedded reinforcements 32, same extending over and past a hinge part 34 and over the hub part 18. A break line 36 is constituted by an internal notch at the edge of the cover 30.

The open floor of the hub part 18 is able to be closed by a separate housing body 40, which consists of a cylindrical main part and an attachment flange 42 adapted to the form of the abutment surface and furthermore a bushing 44 adjoining the floor of the cylindrical main part. On the flange 42 a cover 46 is mounted, which is provided with gas passage openings. Internally the bushing 44 is splined in a manner matching the splines on the end of the steering shaft. Furthermore, the bushing 44 is provided with an axial slot 45 so that the bushing 44 may be clamped athwart its axis on the end of the steering shaft by means of a set screw 48.

The housing body 40 receives a pyrotechnic propellant charge 50 in its interior. Furthermore an electrical fuse 52 is arranged in the housing body. Accordingly the housing body 40 constitutes a pyrotechnic gas generator.

During fitting of the vehicle steering wheel the attachment ring 26 of the folded gas bag 24 is thrust axially against the abutment surface 20 of the hub part 18. By axial displacement the housing body 40 is as well moved so that the flange surface on the cover 46 comes into engagement with the attachment ring 26. By means of a plurality of attachment screws 54 extending through the attachment flange 42, the cover 46 and the attachment ring 26 the housing body 40 is rigidly secured to the hub part 18, which for this purpose is provided with suitable screw threaded holes. The vehicle steering wheel with an integrated gas bag restraining system is now ready for fitting on the end of the steering shaft.

Figure 4:
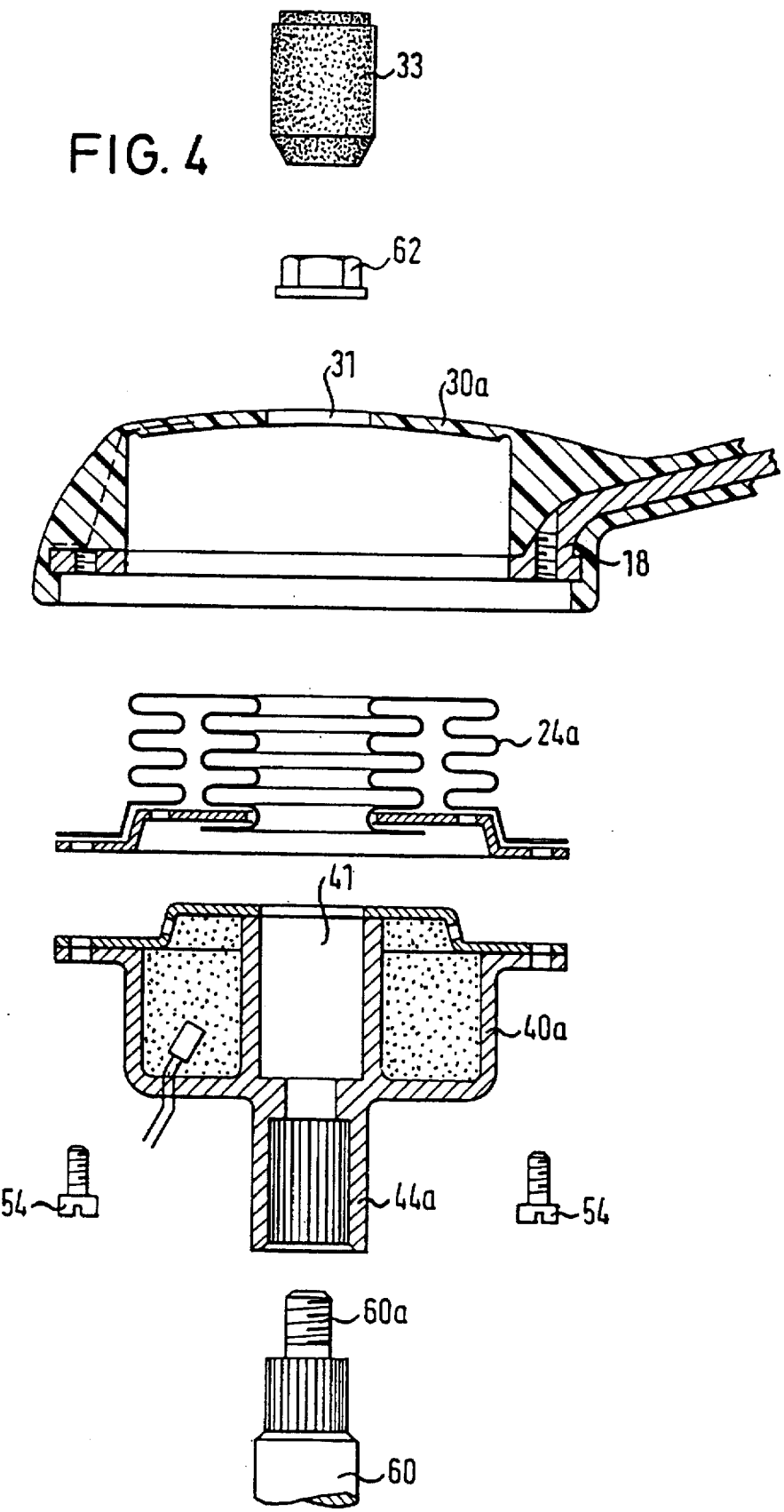
FIG. 4 is a corresponding view of a further embodiment of the vehicle steering wheel.

In the case of the embodiment of the vehicle steering wheel depicted in FIG. 4 there is a provision for attachment on the end of a steering shaft 60 by means of a nut 62, which is screwed on a threaded pin 60a on the steering shaft 60. The bushing 44a of the housing body 40a is in its bottom provided with a hole for the passage of the threaded pin 60a. Moreover, the housing body 40a is provided with an axial passage 41 for the nut 62 and for an assembly tool. In order in the case of this embodiment as well to permit fitting of the vehicle steering wheel completely assembled to the gas bag restraining system to the steering shaft 60, the gas bag 24a is designed in the form of a hollow flexible torus and the cover 30a is provided with a central opening 31, which after fitting is shut off by a plug 33.

What is claimed is:

1. A vehicle steering wheel assembly comprising a steering wheel body encased in a plastic foam casing and having a hub part, a cover formed as an integral component of said plastic foam casing, said hub part having a bottom with a cutout, a folded gas bag unit accommodated in said hub part, and a housing body which contains a pressurized gas source and on one side is able to be attached to said hub part and on the opposite side to a steering wheel shaft.

2. The assembly as claimed in claim 1, wherein said housing body is provided with an internally splined bushing for attachment on a correspondingly externally splined end of the steering shaft.

3. The assembly as claimed in claim 2, wherein said bushing is able to be clamped onto the end of the steering shaft by clamping means extending transversely to said steering shaft.

4. The assembly as claimed in claim 2, wherein said bushing has a hole for the passage of a threaded pin on the end of the steering shaft and the housing body possesses a passage coaxial to the bushing for a fitting tool.

5. The assembly as claimed in claim 1, wherein said housing body possesses an attachment flange which is able to be inserted into an opening in the bottom of the hub part.

6. The assembly as claimed in claim 5, wherein said housing body possesses a cover provided with gas passage openings and mounted on the attachment flange.

7. The assembly as claimed in claim 6, wherein said folded gas bag unit has a mounting ring defining an inflation opening, said mounting ring being clamped between said cover and an abutment surface on the bottom of the hub part.

* * * * *